United States Patent [19]

Hayashi

[11] 4,121,267

[45] Oct. 17, 1978

[54] HIGH SPEED FEEDING AND REWINDING MECHANISM IN A MAGNETIC TAPE RECORDING AND REPRODUCING APPARATUS

[75] Inventor: Yoshiaki Hayashi, Katano, Japan

[73] Assignee: Matsushita Electric Industrial Co., Ltd., Japan

[21] Appl. No.: 791,685

[22] Filed: Apr. 28, 1977

[30] Foreign Application Priority Data

May 4, 1976 [JP] Japan .................................. 51-51030

[51] Int. Cl.² ............................................. G11B 15/66
[52] U.S. Cl. ........................................ 360/85; 360/95
[58] Field of Search ..................... 360/85, 95; 242/199

[56] References Cited

U.S. PATENT DOCUMENTS

| | | | |
|---|---|---|---|
| 3,740,492 | 6/1973 | Inaga ....................................... | 360/85 |
| 3,831,198 | 8/1974 | Kihara et al. ........................... | 360/85 |
| 3,864,742 | 2/1975 | Katoh ...................................... | 360/95 |
| 3,911,491 | 10/1975 | Terao ...................................... | 360/95 |
| 4,035,842 | 7/1977 | Terao et al. ............................. | 360/85 |

Primary Examiner—John H. Wolff
Attorney, Agent, or Firm—Stevens, Davis, Miller & Mosher

[57] ABSTRACT

In a magnetic video tape recorder apparatus of the cassette type a magnetic tape housed in a tape cassette is led out through tape lead out means and then is contacted against magnetic heads for recording and reproducing operations. In a stop operation of the recorder apparatus, the magnetic tape will be restored into the cassette. In a high speed feeding or rewinding operation succeeding a stop operation, the magnetic tape is automatically moved at a high speed after the tape has been restored in the cassette following the actuation of a high speed feed or rewind button after actuation of a stop button.

7 Claims, 9 Drawing Figures

FIG. 9

HIGH SPEED FEEDING AND REWINDING MECHANISM IN A MAGNETIC TAPE RECORDING AND REPRODUCING APPARATUS

BACKGROUND OF THE INVENTION

1. Field of the Invention

The present invention relates in general to a magnetic tape recorder apparatus of a cassette type and in particular to a magnetic video tape recording and reproducing apparatus of a rotating head and helical scanning type in which a magnetic tape is helically wound for a predetermined angle around a head cylinder incorporating therein rotatable magnetic heads for recording and reproducing signals. More particularly, the invention concerns a magnetic video tape recorder of the above type (hereinafter referred to as VTR) wherein the magnetic tape is automatically led out from a tape cassette accommodating therein a supply reel and a winding reel, and is wound around the head cylinder for a predetermined angle.

2. Description of the Prior Art

As is well known in the art, in case of VTR of the helical scanning type having N rotating magnetic heads, it is required that a magnetic tape should be wound around a head cylinder so as to extend over a circumferential length making an angle slightly greater than 360°/n. In most conventional VTRs having two rotating heads, the magnetic tape has to be wound around the head cylinder for an angle somewhat greater than 180° in a Ω-like configuration for example. As a result of this, a friction force between the head cylinder and the magnetic tape may become of high magnitude, which is of course unfavorable in effecting high speed forwarding and rewinding operations. In an attempt to overcome such disadvantages, it has been hitherto known in the conventional VTR that the magnetic tape is automatically detached from the head cylinder and stored in the tape cassette upon actuation of the stop knob or button, and thereafter the high speed forwarding or rewinding operation is allowed to take place. In other words, the arrangement is made such that the buttons for forwarding and rewinding the tape at a high speed can not be promptly actuated, until the magnetic tape has be completely housed in the cassette. Accordingly, the user of a VTR who wishes to carry out the high speed forwarding (forward feeding) or rewinding operation must wait until the magnetic tape has been stored in the cassette after the actuation of the stop button. This is of course inconvenient. In a VTR, the magnetic tape must be wound around the head cylinder for a relatively large angle, as described above. This means that a relatively long length of magnetic tape must be drawn out from the cassette and hence it takes a considerably long time for rewinding the tape into the cassette. In an unrelated meantime, the user must wait unable to do anything. Further, the user must ascertain that the tape has been returned in the cassette before actuation of the buttons for forwarding or rewinding operation.

SUMMARY OF THE INVENTION

A primary object of the invention is to provide a magnetic video tape recording and reproducing apparatus or VTR which eliminates the disadvantages of the conventional VTR described above.

Another object of the invention is to provide a VTR having an arrangement such that manipulation buttons for the high speed forwarding or rewinding operation can be actuated immediately after the actuation of a stop button, whereby the high speed forwarding or rewinding operation can take place automatically when the tape has been stored in the cassette.

With above objects in view, there is proposed according to one aspect of the invention a magnetic tape recorder apparatus comprising: movable tape lead-out means for drawing out a magnetic tape from a magnetic tape cassette accomodating therein a supply reel and a winding reel and causing the magnetic tape to contact with magnetic heads; a first actuating member which in response to actuation of a recording or reproducing button for recording or reproducing operation, is moved from a first position to a second position where a rewinding roller driven by a driving means is locked in a spaced relation with a supply reel supporting base, and restored to the first position in response to actuation of a stop button; a second actuating member which in response to the movement of the first actuating member from the first position to the second position, is moved to a lock position where an intermediate idler urged to bear on both of the rewinding roller and a winding roll supporting base is locked in a state such that the idler is prevented from bearing on the rewinding roller and the winding reel supporting base; first lock means for holding the second actuating member in the lock position when the tape lead-out means are positioned outside the tape cassette; second lock means for locking the idler in a position spaced relation to the rewinding roller and the winding reel supporting base; a first forwarding manipulation lever for releasing the second lock means of the idler, and restoring means for disengaging the rewinding roller from the supply reel supporting base in response to the restoring movement of the second actuating member.

BRIEF DESCRIPTION OF THE DRAWINGS

Above and other objects as well as novel feature and advantages of the invention will become more readily apparent from the description of the preferred embodiments shown, by way of example only, in the accompanying drawings in which.

DETAILED DESCRIPTION OF THE PREFERRED EMBODIMENTS

Figure 5:
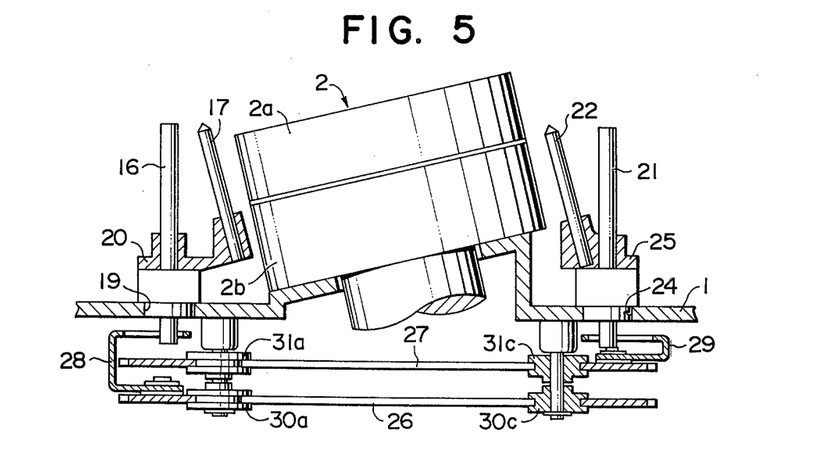
FIG. 5 is an elevational view showing partially in section a magnetic tape lead-out and guiding means for guiding the magnetic tape along with a rotatable magnetic head drum or cylinder.

In the drawings, reference numeral 1 denotes a supporting base plate, 2 denotes a rotatable magnetic head drum or cylinder composed of an upper drum portion 2a and a lower drum portion 2b as clearly shown in FIG. 5. The rotatable head drum 2 is mounted in an inclined state, as can be seen particularly from FIG. 5. In the case of the illustrated embodiment, the lower drum 2b is fixedly secured to the supporting base plate 1, while the upper drum 2a is adapted to be rotated together with the rotatable magnetic heads provided therein by a driving motor (not shown).

Figure 1:
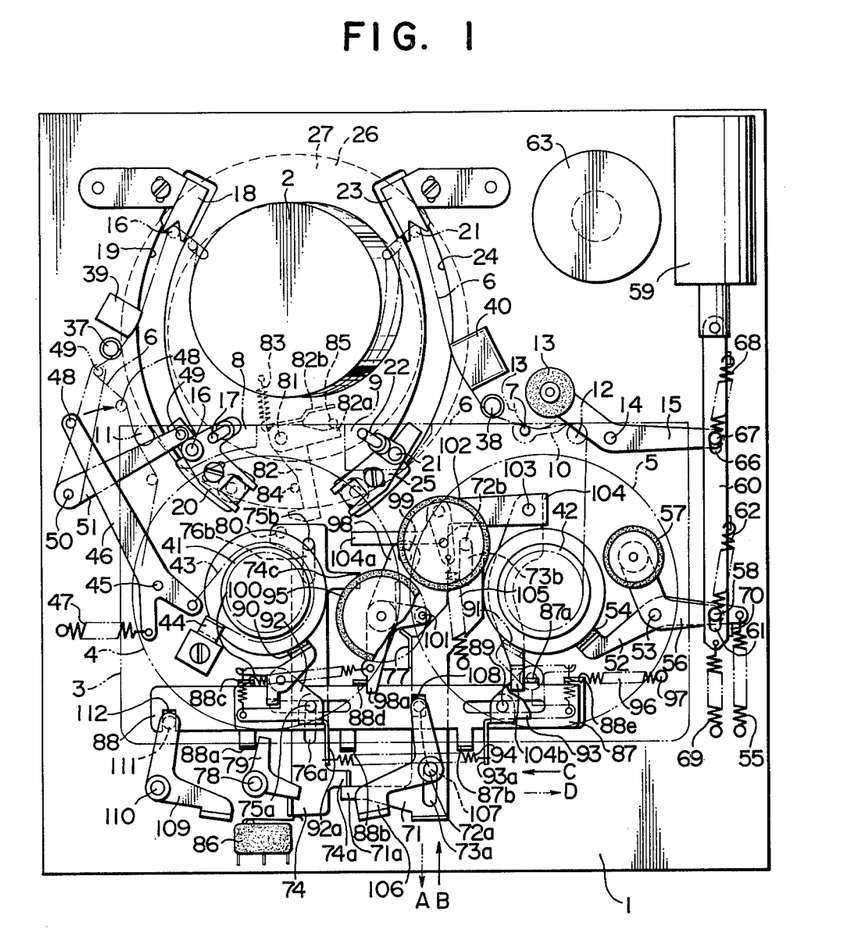
FIG. 1 is a plan view showing a main portion of VTR a in a rest state constructed in accordance with an embodiment of the invention.
Figure 2:
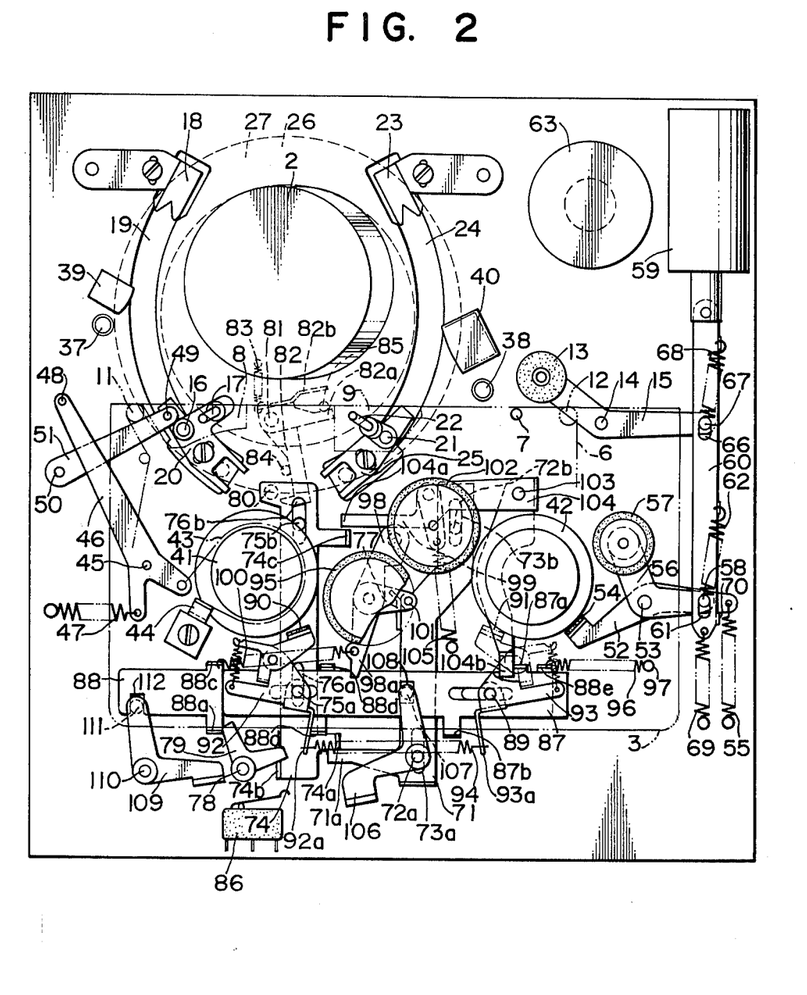
FIG. 2 is a similar view to FIG. 1 but shows the apparatus in a state immediately after a reproducing or play-back button has been actuated.
Figure 3:
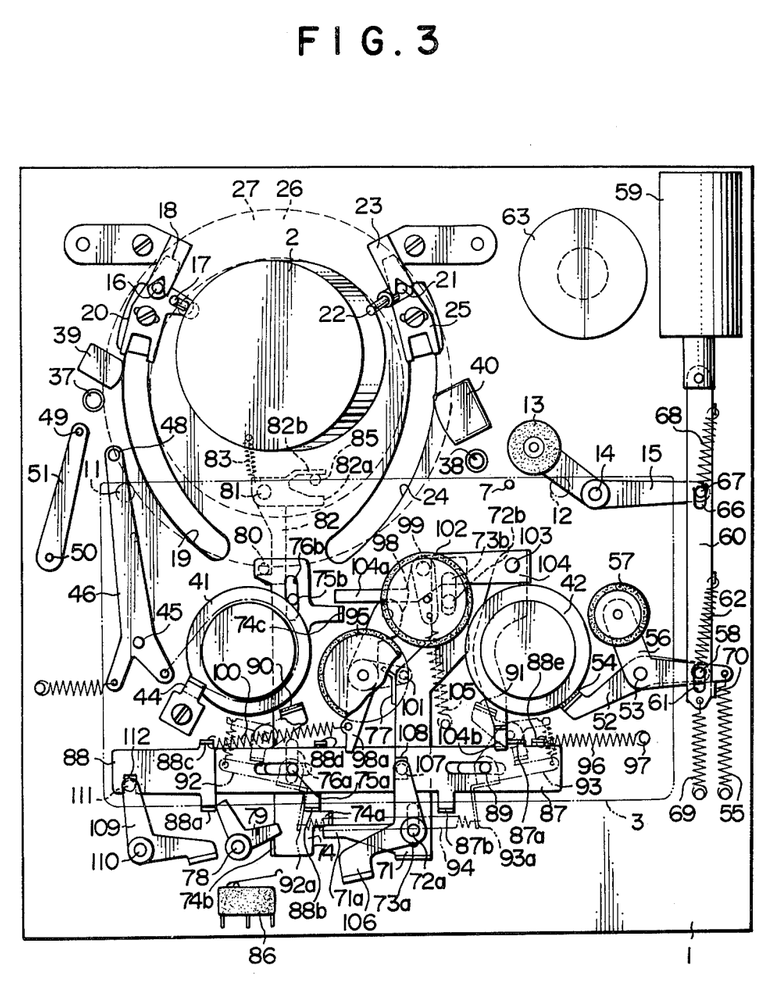
FIG. 3 is a similar view to FIG. 1 but shows the apparatus in the state after the magnetic tape has been drawn out from a cassette.
Figure 8:
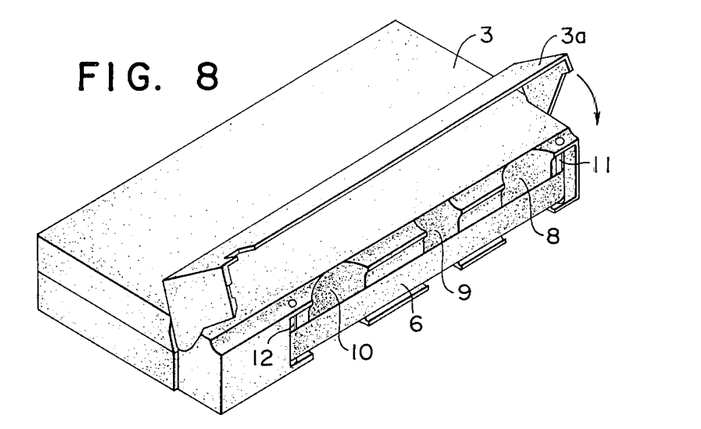
FIG. 8 is a perspective view showing an example of a tape cassette which can be used in the apparatus according to the invention.

Referring to FIGS. 1, 2 and 3, a magnetic tape cassette 3 shown in broken line comprises a tape supply reel 4 and a winding reel 5 and accommodates therein a magnetic tape 6 adapted to be wound on these reels. Referring to FIG. 8, the cassette 3 is formed with a first notch 8, second notch 9 and a third notch 10 which are adopted to receive first and second tape lead-out means and a capstan 7, respectively inside of the magnetic tape 6 when the cassette 3 is loaded on the supporting base plate 1 in a predetermined position. When the tape is in the restored state, the tape stretches between guide post 11, 12 mounted in the cassette 3 so as to extends transversely across the first notched concave portion 8, the second notched concave portion 9 and the third notched concave portion 10. When the cassette is not used, the front side on which the aforementioned notches 8, 9 and 10 are formed, is covered by a cover member 3a. On the other band, when the cassette is loaded on the base plate 1, the cover member 3a is opened and the tape 6 is partly in an exposed state such as shown in FIG. 8.

A pinch roller 13 feeds the magnetic tape 6 in association with a capstan 7 at a constant speed in a direction, e.g. from the left to the right as viewed in FIG. 1. To this end, the pinch roller 13 is rotatably mounted on a lever 15 at its one end. The lever 15 is in turn pivotally mounted on the base plate 1 through a supporting stud 14 so as to be horizontally rotatable. Numerals 16 and 17 denote, respectively, a first vertical pin and a first inclined pin which are adapted to be positioned in the first notch 8 of the cassette 3. These pins 16 17 are anchored on a first movable body 20 (FIG. 5) and constitute parts of the first tape lead-out and guiding means. The first movable body 20 is movable in an arcuate path extending substantially along the left half circumference of the rotatable magnetic head drum 2 from a first position within the first notch 8 (this position will be hereinafter referred to as a non-operative position) to a second position where the first vertical pin 16 bears against a first positioning means 18 (this position will be hereinafter referred to as an operative position). To this end, a first elongated slot 19 of a corresponding arcuate form is formed in the base plate 1 and the movable body 20 is slidably engaged in the slot 19 so as to be guided thereby.

Reference numerals 21 and 22 denote, respectively, a second vertical pin and a second inclined pin which are adapted to be positioned in the second notch 9 of the cassette 3. These pins 21 and 22 are anchored on a second movable body 25 (FIG. 5) and constitute parts of the second tape lead-out means. The second movable body 25 can be moved in an arcuate path extending substantially along the right half circumference of the rotatable head drum 2 from a first position (hereinafter referred to as a non-operative position) where the pins 21, 22 are in the first notch 9 to a second position (hereinafter referred to as operative position) where the second vertical pin 21 bears against a second positioning means 23. To this end, a second elongated slot 24 of a corresponding arcuate form is formed in the base plate and the movable body 25 is slidably engaged in the slot 24 thereby so as to be guided thereby. In this connection, it is to be noted that the first and second movable bodies 20 and 25 are adapted to be driven by first and second annular rings 26 and 27, respectively, which are coaxially disposed in a superposed positional relation below the base plate 1 in a position substantially corresponding to that of the rotatable magnetic head drum 2. Members 28 and 29 serve to operatively couple the movable bodies 20 and 25 to the respective rings 26 and 27, as can be seen from FIGS. 5 and 6. It will be found that the first and the second rings 26 and 27 are rotatably supported on a lower surface of the base plate 1 by means three rollers 30a; 30b; 30c and 31a; 31b; 31c, respectively which are arranged along the inner peripheries of the rings 26 and 27. Gear teeth formed in the outer peripheral surfaces of the rings 26 and 27 are meshed with first and second spur gears 32 and 33, respectively, which are meshed with each other with the first spur gear 32 being operatively coupled to a worm 34 rotated by an reversible electric motor (not shown) by way of a rotatable shaft 35 and a gear 36, as is clearly shown in FIG. 7. Thus, the gears 32 and 33 and hence the rings 26 and 27 are rotated in opposite directions to each other by means of the electric motor.

Reference numerals 37 and 38 denote, respectively, a first and a second tape guide means which are provided on the base plate 1 outside of the first and second elongated slots 19 24 adjacent thereto. Numeral 39 designates an erasing head provided in the path of the tape between the first tape guide means 37 and the aforementioned first positioning means 18, and numeral 40 denotes a composite magnetic head for recording and reproducing audio signals, and control signals which is provided in the path of tape between the second positioning means 23 and the second tape guide means 38. Numerals 41 and 42 denote reel supporting discs for rotationally driving the supply reel 4 and the winding reel 5, respectively. Numeral 43 designates a brake band which is adapted to be detachably engaged with the outer periphery of the supply reel supporting disk 41 and serves to apply a required back tension to the tape 6 by applying a frictional braking force of an appropriate magnitude to the supply reel supporting disk 41, when the recorder is operated in a recording or reproducing mode. The brake band 43 has one end secured to a fitting member 44 and the other end connected to an arm of a Y-like lever 46 which is pivotally mounted on the base plate by means of a supporting shaft 45. Connected between another arm or branch of the Y-like lever 46 and the base plate 1 is a tension spring 47 which resiliently urges the lever 46 to rotate in the clockwise direction about the shaft 45 and hence urges the brake band 43 toward the braking position thereof. Mounted on the stem portion of the lever 46 is a tension pin 48 which is adapted to bear on the outer side of the magnetic tape 6 fed from the cassette so as to apply tension to the tape 6. Numeral 49 denotes a pin which can be positioned in the first notch 8 of the cassette 3 as is in the case of the first vertical pin 16 and the first inclined pin 17. The pin 49 is mounted on a lever 51 at its one end. The lever 51 is in turn rotatably supported on the base plate 1 by means of a supporting shaft 50. The end portion of the lever 51 is adapted to bear on the forward end portion of the first movable body 20. More particularly, when the first movable body 20 is being displaced from the non-operative position shown in FIG. 1 to the operative position shown in FIG. 3, the lever 51 and hence the pin 49 are pushed by the body 20 so as to be rotated about the shaft 50 in the counter clockwise direction at a speed equal to that of the moving body 20. However, when the lever 51 has been rotated for a predetermined distance in the counter clockwise direction, the lever 51 is disengaged from the first movable body 20. At that time, the lever 51 is, however, engaged with a cam (not shown) formed in the outer periphery of the first ring 26 to continue further rotation in the counter clockwise direction, whereby the pin 49 is finally brought to a position (refered to as its operative position) to make the magnetic tape 6 contact with the erasing head 39. During the later phase of the movement, the moving speed of the pin 49 is not necessarily equal to that of the first movable body 20. Further when the pin 49 is moved from the non-operative position where the pin 49 is in the first notch 8 of the cassette 3 to the above mentioned operative position, the lever 46 is rotated about the shaft 45 in the clockwise direction under the influence of the tension spring 47 in association with the counter clockwise rotation of the lever 51, as a result of which the tension pin 48 is moved rightwardly from the leftmost position (non-operative position) shown in solid line in FIG. 1 and bears under a predetermined pressure on the magnetic tape 6 running from the tape guide 11 of the cassette 3 to the pin 49, thereby to apply tension to the tape. As the lever 46 is rotated in the clockwise direction while the lever 51 is rotated in the counter clockwise direction, the contacting pressure of the brake band 43 to the outer periphery of the supply reel supporting disk 41 is increased, thereby preventing the supply reel 4 from rotating due to inertia after the tape leading-out operation which gives rise to the rotation of the disk 41 has been completed. In this manner, any slack is positively prevented from occurring in the tape portion extending from the supply reel 4 to the tape-wound portion of the head drum 2. Mounted rotatably on the base plate through a supporting shaft 53 is a lever 52 which is provided at one end thereof with an auxiliary brake shoe 54 of a suitable material such as felt, facing toward the outer periphery of the winding reel supporting disk or base 42. The other end of the lever 52 is connected to the base plate 1 through a tension spring 55 which urges the lever 52 in the clockwise direction so that the brake shoe 54 may bear on the outer periphery of the supporting disk 42 with a predetermined contact pressure.

Mounted rotatably on the supporting shaft 53 is another level 56 having one end carrying a roller 57 provided on its outer peripheral surface with a rubber layer so that it can be moved to and from the outer periphery of the winding reel supporting disk 42. The other end of the lever 56 is provided with a pin 58 which is inserted into an elongated slot 61 formed in an actuator rod 60 operated from a first position (shown in FIGS. 1 and 3) to a second position through a solenoid 59. Connected between an intermediate portion of the actuator rod 60 and the pin 58 is a tension spring 62 which urges the roller 57 to contact with the outer periphery of the winding reel supporting disk 42 under a predetermined contacting pressure, when the actuator rod 60 is moved to the second position. It is to be noted that the roller 57 is constantly rotated at a low speed in the counter clockwise direction by the motor 63 through a power transmitting means such as a belt, when the recorder apparatus is electrically energized. With the arrangement described above, when the solenoid 59 is electrically energized upon the recording or reproducing operation, i.e. after the first and second tape lead-out means have been brought to the aforementioned operative position from the non-operative position in association with the rotations of the first and second rings 26 and 27 in the clockwise and the counter clockwise directions, respectively, and subsequently a micro-switch 65 is actuated by the cam 64 formed in the outer periphery of the first ring 26 to energize the solenoid 59, the roller 57 is caused to come into contact with the outer periphery of the winding ring supporting disk 42 through the actuator rod 60 and the lever 56. As a result, the winding reel supporting base 42 is rotated in the clockwise direction and thus winds up the magnetic tape 6 as fed through the capstan 7 and the pinch roller 13 without any slack in the tape.

Anchored in the other end portion of the lever 15 is a pin 67 which extends through the elongated slot 66 formed in the actuator rod 66. A tension spring 68 is connected between the pin 67 and the actuator rod 60 and adapted to urge the pinch roller 13 to bear on the capstan 7 under a predetermined pressure through the magnetic tape, when the actuator rod 60 is moved to the second position. Further, connected between the actuator rod 60 and the base plate 1 is a restoring tension spring 69 of a relatively great force which serves to move the actuator rod 60 to the first position so that the pinch roller 13 can be disengaged from the capstan 7 and at the same time the roller 57 detached from the outer periphery of the winding reel disk 42, as is shown in FIGS. 1 to 3. A bent portion 70 is formed in the end portion of the actuator rod 60 and serves as a stopper for restricting rotation of the lever 56 in the clockwise direction under the influence of the tension spring 55, when the actuator rod 60 is located in the first position as shown in FIGS. 1 to 3. Additionally, the portion 70 functions to push the lever 56 against the force of the tension spring 55 so as to rotate it in the counter clockwise direction, when the actuator rod 60 is displaced from the first position to the second position. Numeral 71 designates a first actuating member disposed movably along a linear path through the cooperation of supporting shafts 72a, 72b and elongated slots 73a, 73b, and 74 denotes a second actuating member disposed movable in the same direction the first actuating member 71 as so as to linearly move in association with supporting studs 75a, 75b and elongated slots 76a, 76b. It is to be mentioned that the first and second actuating members 71 and 74 are resiliently urged in the direction indicated by arrow A in FIG. 1 by suitable tension springs (not shown). Besides, the first actuating member 71 is adapted to be displaced in the direction B when the reproducing button or recording button (not shown) is pushed down. The reproducing or play-back button (or recording button) is adapted to be locked in the pushed-down position. Accordingly, when the play-back button (or recording button) is pushed down, the first actuating member 71 remains in the state displaced in the direction B. When the reproducing or play-back button (or recording button) is released from the locked position, the first actuating member 71 is restored to the direction A. Further, due to such an arrangement that a portion 71a of the first actuating member 71 bears on a portion 74a of the second actuating member 74, the second actuating member 74 is also moved in the direction B, when the first actuating member 71 is displaced in the direction B. A stopper 77 is integrally formed in the first actuating member 71 at a substantially center portion thereof by bending a side edge portion thereof. The function of the stopper 77 will be hereinafter described.

Figure 7:
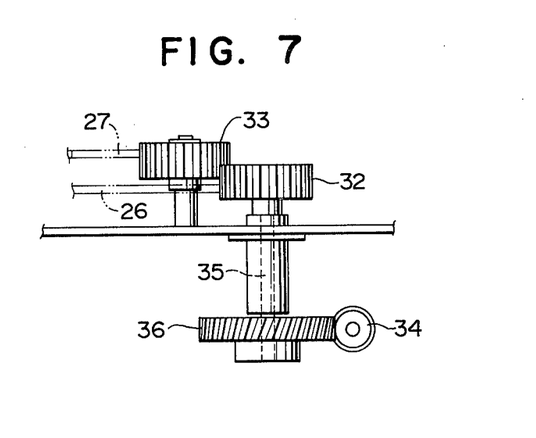
FIG. 7 is a side view showing a portion of the mechanism shown in FIG. 6.

The second actuating member 74 is provided with a bent portion 74b integrally formed at the front end by bending a corresponding end portion of the member 74 upwardly. The portion 74b serves to rotate a L-like arm 79 in the counter clockwise direction which is rotatably mounted on the base plate 1 through a supporting shaft 78 in the vicinity of the second actuating member 74, when the latter is displaced in the direction B. A downwardly extending pin 80 is anchored in the second actuating memver 74 at the other or rear end thereof. A locking lever 82 is rotatably mounted on the lower surface of the base plate 1 through a supporting shaft 81 adjacent to the moving path of the pin 80. The lock lever 82 is urged in the clockwise direction by a tension spring 83. When the apparatus is at rest, the lock lever 82 has been rotated in the counter clockwise direction by a pin 84 anchored in the first ring 26 against the force of the tension spring 83 with a portion 82a thereof bearing on the stopper pin 85. In this state, the pin 80 can not be locked by the lock lever 82 merely through the movement of the second actuating member 74 in the direction B. However, when a switch (not shown) is closed by pushing down the reproducing button or recording button and a motor (not shown) for driving the gear 36 shown in FIG. 7 is supplied with electric energy, the pin 84 is rotated in the clockwise direction as viewed in FIG. 1 because the first ring 26 and second ring 27 are rotated in the clockwise and the counter clockwise directions, respectively. Consequently, the lock lever 82 is rotated in the clockwise direction under the action of the tension spring 83 and brought to the position to engage with the pin 80. The rotating range of the lock lever 82 in the clockwise direction is restricted by the fat that a portion 82b of the lever 82 comes into contact with the stopper pin 85. Reference numeral 86 denotes a microswitch which is adapted to be actuated by the front end of the second actuating member 74 when the latter is returned in the direction A.

First and second slide members 87 88 having identical widths and different lengths are disposed in a vertically superposed relation one over another. The members 87, 88 are arranged in an orthogonal direction to first and second actuating members 71, 74 and are adapted to be guided by supporting pins 75a and 89 along a linear path in the lateral directions as indicated by arrows C and D in FIG. 1. Further, first and second brake members 92, 93 having main brake shoes 90, 91 mounted on respective end portions are rotatably supported by the pins or studs, so that the brake shoes 90 and 91 may be moved to and from the outer peripheries of the supply reel supporting disk 41 and the winding reel supporting disk 42, respectively. In the illustrated embodiment, the first and the second brake members 92 and 93 each comprises in practice a first rotatable member pivotally mounted on the supporting shaft 75a or 89 and a second rotatable member pivotally connected to the first rotatable member and having the main brake shoe 90 or 91 at the free end thereof with a tension spring being connected between the first and second rotatable members, although such structure is not illustrated with the aid of reference numerals. Of course, each of the first and the second brake members 92 93 may be composed of a single rotatable member.

Numeral 94 denotes a tension spring which serves to urge the first and the second brake members 92 and 93 to be rotated in the counter clockwise and clockwise directions, respectively, thereby to cause the main brake shoes 90 and 91 to bear against the associated supporting disks 41 and 42, respectively. The tension spring 94 is connected between bent portions 92a and 93a integrally formed in the first and second brake members 92 and 93.

In this connection, it should be mentioned that the first and the second brake members 92 and 93 are interlocked with each other through a suitable link mechanism in such a manner that, when one of the main brake shoes, e.g. 90 is moved away from the outer periphery of the associated reel supporting base or disk, e.g., 41, the other main brake shoe 91 is also disengaged from the outer periphery of the associated reel supporting disk 42, although such interlocking mechanism is not shown in the drawings.

The second slide member 88 is formed with a first bent portion or piece 88a and a second bent portion 88b at the front side edge. The first bent portion 88a is adapted to displace the second slide member 88 in the direction indicated by C when the portion 88a is pressed by the L-like arm 79 rotated in the counter clockwise direction. On the other hand, the second bent portion 88b is adapted to bear on the bent portion 92a of the first brake member 92 so as to rotate the latter about the pivot 75a in the clockwise direction and hence the second brake member 93 in the counter clockwise direction about the pivot 89. At the opposite side of the second slide member 88, there are provided a third bent portion 88c, a fourth bent portion 88d which take part in the operation of a rewinding roller 95 described hereinafter, and a fifth bent portion 88e. A tension spring 96 of a relatively great force is suspended between the fifth bent portion 88e and a pin 97 secured to the base plate 1 and urges the second slide member 88 in the direction indicated by arrow D in FIG. 1. Rotatably mounted on the base plate 1 through a supporting stud 99 is a swingable lever 98 of a substantially "T"-like, shape which rotatably carries the rewinding roller 95 provided with a rubber layers on its outer periphery in the vicinity of the supply reel supporting base 41 and is adapted to move the rewinding roller 95 to and from the outer periphery of the supply reel supporting disk 41. A tension spring 100 is suspended between one end portion 98a of the lever 98 and the third projection 88c of the second slide member 88 to urge the swingable lever 98 to rotate in the clockwise direction about the shaft 99 thereby causing the rewinding roller 95 bear on the outer periphery of the supply reel supporting disk 41. Further, the end portion 98a of the swingable lever 98 is adapted to engage with the fourth projection 88d of the second slide member 88. In the engaged state, the rotation of the lever 98 in the clockwise direction and hence the displacement of the rewinding roller 95 toward the supply reel supporting disk 41 are restricted.

The swingable lever 98 is provided with a pin 101 secured on a cross-wisely extending projection thereof which pin 101 is adapted to be disengageably engaged by the aforementioned stopper 77 on the left-hand side. It will be appreciated that the rewinding roller 95 is rotated in the clockwise direction at a high speed by the motor 63 through a suitable transmission means such a drive belt.

Reference numeral 102 denotes an idler which is interposed between the rewinding roller 95 and the winding reel supporting disk or base 42 when the apparatus is operated in the high speed forward feeding mode. The idler 102 is rotatably mounted on an arm 104 which in turn is swingably supported on the base plate 1 through a shaft 103. The arm 104 has an end portion 104a extending toward a position where the end portion 104a can bear against the bent portion 74c formed in the second actuating member 74 at the right side edge, while the other end portion 104b of the arm 104 extends toward a position where the end position 104b can bear on the left side of the first bent portion 87a formed integrally in the first slide member 87 by upwardly bending a portion of the latter.

Reference numeral 105 designate a tension spring for urging the arm 104 in such direction that the idler 102 may be interposed between the rewinding roller 95 and the winding reel supporting disk 42. It should be noted that the first slide member 87 is formed with the second bent portion 87b projecting upwardly at the front side edge thereof. This projection 87b serves to rotate the second brake member 93 about the shaft 89 in the counter clockwise direction thereby to disengage the main brake shoe 91 from the outer periphery of the associated reel supporting disk 42 when the second slide member 87 is displaced in the direction D. Consequently, the second brake member 92 is also concurrently rotated in the clockwise direction about the supporting stud 75a thereby to detach the main brake shoe 90 from the outer periphery of the supply reel supporting disk 41. An arm 106 is also rotatably mounted on the shaft 72a and has a pin 107 secured at one end thereof. The pin 107 is inserted in an angular slot 108 formed in the first slide member 87 so that, when the high speed forward feeding button (not shown) is actuated, then the arm 106 is rotated in the clockwise direction, whereby the first slide member 87 can be displaced in the direction D. It is to be noted that the first slide member 87 is resiliently biased in the direction C (FIG. 1) by a tension spring of a relatively great force (not shown), so that the arm 104 is rotated in the clockwise direction against the force of the tension spring 105. Numeral 109 denotes an arm which is caused to rotate in the counter-clockwise direction about a supporting stud 110 in response to the actuation of the rewinding push button or key. The arm 109 has a pin 111 secured at one end portion thereof which is fitted in a notch 112 formed in the second slide member 88 so that the latter can be displaced in the direction C against the spring force of the tension spring 96 upon rotation of the arm 109 in the counter-clockwise direction.

Next description will be made on a control system for the electric motor by referring to FIG. 9. In this figure, numeral 120 denotes an electric power source for driving relays 121 and 134, and numeral 122 denotes a switch interlocked with the reproducing or play-back push button or recording key. The switch 122 has a contact adapted to be closed when either one of the above buttons or keys is pushed down. Further, an arrangement is made such that the switch 122 is opened when the stop button (not shown) is pushed down to restore the reproducing or the recording button.

A first power supply source 124 and a second supply source 125 are provided for energizing the motor 63 described hereinbefore. Numeral 126 denotes a relay switch which is switched over to a position shown in dotted line from the solid line position when the relay 121 is energized.

The first power supply source 124 supplies a voltage of a sufficient voltage amplitude for the capstan 7, and the roller 57 (FIG. 1) to be rotated to feed the tape at a speed required for the recording or reproducing operation. On the other hand, the second power source 125 is utilized for rotating the reel supporting disk 41 through the roller 95 when the magnetic tape portion wound around the head cylinder will be restored into the cassette 3. If the driving power for rotating the disk 41 should be excessively high, an abnormal tension would be disadvantageously applied to the magnetic tape. Accordingly, the output voltage of the second source 125 is set at a considerably low lever as compared with the voltage of the first power source 124.

Numeral 127 denotes a reversible motor coupled to the worm 34 and adapted to be rotated in the forward direction through energization from a power source 128 and in the reversed direction when energized from another power source 129.

Relay 121 has contacts 130 and 131 which are changed over to the positions represented by dotted lines when the relay 121 is electrically energized.

Figure 6:
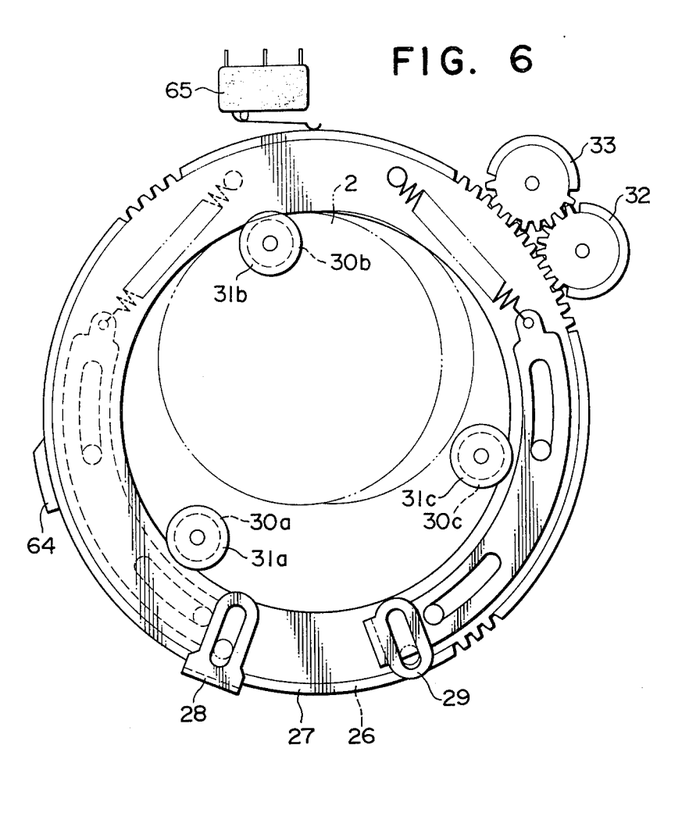
FIG. 6 is a plan view of the mechanism shown in FIG. 5.

Numeral 86 denotes a switch which is closed when the second actuating member 74 is displaced in the direction B as shown in FIG. 1. Switch 65 is opened when the cam 64 is rotated in the clockwise direction, as is shown in FIG. 6. Switch 135 is closed when the high speed feeding button is pushed down, while switch 136 is closed when the rewinding button is actuated. The relay 134 has contacts 132, 138 and 139 which are adapted to be switched over to positions shown in dotted lines upon energization of the relay 134.

Next a description will be provided of the operations and manipulation of the illustrated apparatus.

In the first place, the cassette 3 is loaded in the VTR apparatus at position as indicated by a broken line with the supply reel 4 resting on the supporting disk 41 while the winding reel 5 is disposed on the associated supporting base 42. In this state, the first vertical pin 16, the first inclined pin 17 and the pin 49 are positioned within the first notch 8 of the cassette 3 on the inner side of the magnetic tape 6. On the other hand, the second vertical pin 21 and the second inclined pin 22 are positioned within the second notch 9 on the inner side of the tape 6, while the capstan 7 is positioned in the third notch 10 on the inner side of the magnetic tape 6. When the reproducing or recording button or key (not shown) is pushed in this state, the first actuating member 71 is displaced in the direction B shown in FIG. 1 until the stopper 77 engages with the pin 101 at the left side thereof as viewed in FIG. 1. In the meantime, the second actuating member 74 is also moved in the direction B due to the engagement between the portion 71a of the first actuating member 71 and the portion 74a of the second actuating member 74. Further, the movement of the second actuating member 74 will bring about rotation of the L-like arm 79 in the counterclockwise direction through the bent piece 74b. At the same time, the second slide member 88 is moved in the direction C (FIG. 1) against the force of the tension spring 96 due to the engagement between the first bent piece or projection 88a of the slide member 88 and the L-like arm 79. Such conditions are shown in FIG. 2.

In the above described state, the second bent piece 88b formed in the second slide member 88 pushes the first brake member 92 in the direction C through the bent portion 92a formed in the member 92. As a result, the first brake member 92 is rotated in the clockwise direction about the supporting shaft 75a, whereby the main brake shoe 90 is detached from the outer periphery of the supply reel supporting disk 41. Additionally, the second brake member 93 is also rotated in the counter clockwise direction about the stud 89 through aforementioned link mechanism, whereby the main brake shoe 91 is also disengaged from the outer periphery of the winding reel supporting support 42.

Since the displacement of the second slide member 88 in the direction C accompanies the movement of the third bent portion 88c and the fourth bent piece 88d in the same direction C, the swingable lever 98 tends to rotate in the clockwise direction about the stud 99. However, this rotation of the lever 98 is prevented because of the stopper 77 positioned at the left side of the pin 101, as a result of this the spring 100 is tensioned and thus a large amount of spring energy is stored in the spring 100, which is utilized to cause the rewinding roller 95 to bear against the outer periphery of the supply reel supporting disk 41 at the time of the rewinding operation.

Figure 9:
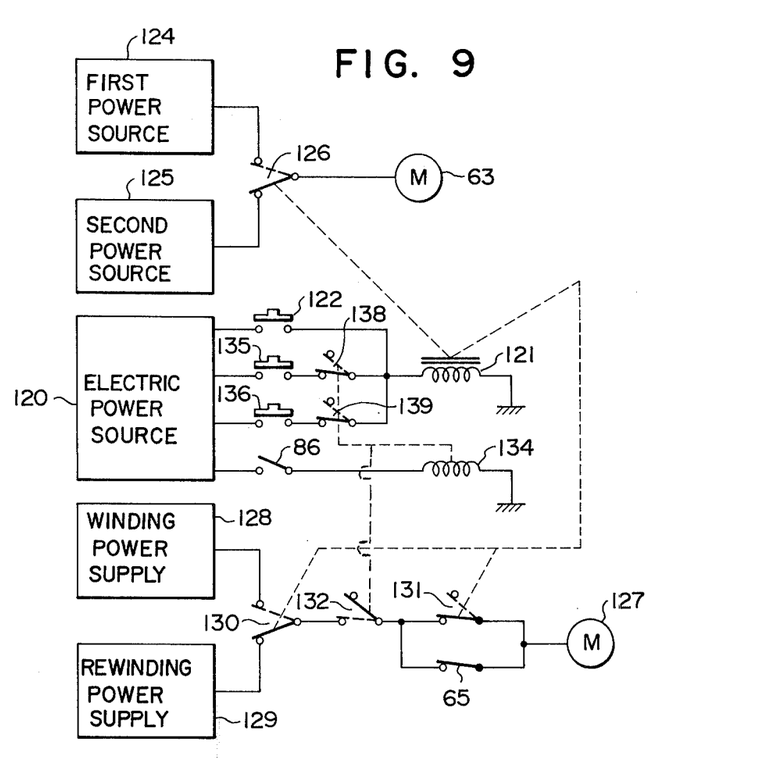
FIG. 9 is a circuit diagram of an electric circuit for a driving system including an electric motor.

Referring to FIG. 9, the switch 122 is closed in response to the actuation of the play-back button or recording button and thus the relay 121 is energized. The relay contacts 126, 130 and 131 are then switched over to the positions shown in dotted lines. At the same time, the second actuating member 74 is moved away from the switch 86 in response to the actuation of the above button, the switch 132 is also closed so that the motor 127 is driven in the forward direction by the power supply source 128 through the switch 65. The motor 127 will then drive on one hand the first ring 26 in the clockwise direction through the worm gear 34, gear 36, shaft 35 and the first spur gear 32 and on the other hand drives the second ring 27 in the counterclockwise direction through the second spur gear 33 meshing with the first spur gear 32. As described hereinbefore, since the first movable body or unit 20 is connected to the first ring 26 through the first coupling means 28, the former is moved in the clockwise direction round the rotatable head drum 2 along the first guide slot 19, while the second movable body or unit 25 which is coupled to the second ring 27 through the second coupling means 29 is moved round the head drum 2 in the counterclockwise direction along the second guide slot 24. The movements of these units 20 and 25 will result in displacement of the first vertical pin 16 and the first inclined pin 17 (or one of them) from the first notch 8 formed in the cassette 3 as well as displacement of the second vertical pin 21 and the second inclined pin 22 (or one of them) from the second notch 9 of the cassette 3, whereby the magnetic tape 6 is drawn out the cassette. When the first and the second vertical pins 16 and 21 bear against the respective positioning means 18 and 23 and are held thereby in position, the first and second vertical pins 16 and 21 as well as the first and second inclined pins 17 and 22 are in the positions where they serve as the guide pins for guiding magnetic tape 6. When this state has been established the microswitch 65 is actuated by the cam 64 formed in the first ring 26 shown in FIG. 6, whereby the motor coupled to the worm gear 34 is deenergized to stop the rotation of the first and second rings 26 and 27. The first and second vertical pins 16; 21, the first and second inclined pins 17; 22 and the first and second movable bodies 20; 25 will remain at the operative positions shown in FIG. 3. The magnetic tape 6 led out from the cassette 3 is wound around the cylindrical outer surface of the head drum 2 so as to extend over a circumferential length making an angle greater than 180° in a substantially inverted Ω-like geometry. The state of the magnetic tape 6 in the operative state is shown in FIG. 1 by a broken line.

The rotation of the first ring 26 in the clockwise direction will cause also the movement of the pin 84 in the same direction. Thus, the lock lever 82 which has been prevented from rotation by the pin 84 now pivoted about the stud 81 in the clockwise direction under the force of a tension spring 83 to the position where the lock lever 84 can latch the pin 80. In this manner, the second actuating member 74 is prevented from being restored in the direction A.

During the initial phase of the displacement of the first movable unit 20, the lever 51 is pivoted about the supporting shaft or stud 50 in the counterclockwise direction from the position shown in solid line in FIG. 1 to the position shown in broken line, as a result of which a portion of the magnetic tape is biased by the pin 49 so as to make good contact with the erasing head 39. As the lever 50 is pivoted in the counterclockwise direction, the lever 46 is pivoted in the clockwise direction about the fulcrum 45. Then, the tension pin 48 mounted at the free end of the lever 46 will bear on the tape portion extending between the tape guide 11 of the cassette 3 and the pin 49 at a predetermined contacting pressure under the influence of the tension spring 47, whereby the magnetic tape is maintained in the tensioned state. Due to the rotation of the lever 46 in the clockwise direction, the brake band 43 is pulled at one end thereof and thus braking force of a predetermined magnitude is applied to the supply reel supportion disk 41. The combined action of the pin 49 and the tension pin 48 will effectively eliminates the possibility of the magnetic tape 6 being slackened, when it is led out by the first tape lead-out means.

On the other hand, since a braking force is applied to the winding reel supporting disk 42 by the auxiliary brake shoe 54, the magnetic tape 6 is also prevented from becoming slack when it is led out by the second tape lead-out.

Upon actuation of the micro-switch 65 (which may be of course replaced by any suitable other switch) after the completed tape lead-out operation, the solenoid 59 is energized so that the actuator rod 60 is operated from the first position shown in FIGS. 1 to 3 to the second position, where the lever 15 is allowed to pivot about the shaft 14 in the counterclockwise direction thereby causing the pinch roller 13 bear against the capstan 7 through the tape 6. Since the motor 63 is energized from the first power supply source 124, as shown in FIG. 9, the contact between the pinch roller 13 and the capstan 7 under pressure allows the magnetic tape 6 to run toward the winding reel 5 at a constant running speed. In this case, since the lever 56 is pivoted in the counterclockwise direction, the roller 57 driven in the counterclockwise direction by the motor 63 is caused to come into contact with the outer periphery of the winding reel supporting disk 42, whenever the auxiliary brake shoe 54 carried by the lever 52 is disengaged from it. Thus, the winding reel supporting disk 42 and hence the winding reel 5 are operated under rotation in the clockwise direction and the magnetic tape 6 fed through the capstan 7 and pinch roller 13 can be wound on the reel 5 without being subjected to any relaxation.

In this manner, the magnetic tape 6 runs at a constant speed when it is wound around the outer cylindrical surface of the rotatable head drum 2, whereby reproduction or recording of video signals or the like is effected by the rotating magnetic heads of the conventional type accommodated in the head drum 2, while reproduction or recording of audio signal and control signal is performed by the stationary magnetic head 40.

Now, it is assumed that the stop button or key (not shown) is pushed down or alternatively a tape end detector means (not shown) of a conventional type is actuated when the apparatus is operated in the reproducing or recording state described above. Then the first actuating member 71 is returned in the direction A shown in FIG. 1, while the second actuating member 74 remains in the latched state by the lock lever 82. The actuation of the stop button will also cause the switch 122 (FIG. 9) to be opened, whereby the relay 21 is deenergized with the contacts 126, 130 and 131 switched over to the positions shown in solid lines. As a consequence, the motor 127 is reversed in the rotating direction and the first and second tape lead-out means are returned from the operative position shown in FIG. 3 to the non-operative position shown in FIGS. 1 and 2. Concurrently, the pin 49 as well as the tension pin 48 are reset to the original positions indicated by solid lines in FIGS. 1 and 2. At the same time, the solenoid 59 is deenergized, involving the disengagement of the pinch roller 13 from the capstan 7. The roller 57 is also moved away from the winding reel supporting disk 42 and the auxiliary brake shoe 54 is brought into contact with the supporting disk 42 under pressure.

Since the restoring movement of the first actuating member 71 in the direction A will cause the swingable lever 98 to be released from the stopper 77, the lever 98 will be pivoted in the clockwise direction under force of the tension spring 100. As a result, the rewinding roller 95 driven by the motor 63 in the clockwise direction makes contact with the outer periphery of the supply reel supporting disk 41 under pressure. Since the motor 63 is at that time supplied with energy from the second power source 125, the roller 95 is driven at a low speed as described hereinbefore. In this manner, the magnetic tape 6 led out from the cassette 3 can be wound on the supply reel 4 without being loosened, when the first and second tape lead-out and means are restored to the starting position. As these tape lead-out means approach their respective starting positions in the course of restoring or returning movement, the lock lever 82 is rotated in the counterclockwise direction by the pin 84 and thus the pin 80 is released from the locked state. At this time, the second actuating member 74 is now permitted to be restored in the direction A under the influence of a tension spring (not shown). Then, the second slide member 88 is released from the constrained state through the L-like arm 79 and can be returned in the direction D shown in FIG. 1 with the aid of the tension spring 96. In the meanwhile, the swingable lever 98 is also pivoted in the counterclockwise direction by the fourth projection 88d, whereby the tape winding-up operation of the supply reel 4 is stopped. Thus, the magnetic tape portion led out from the cassette 3 for reproducing or recording operation is again accommodated within the cassette 3. Further, since the return movement of the second slide member 88 in the direction D causes disengagement of the projection 92a from the bent piece or projection 88b, the first and second brake members 92, 93 can be returned to the positions shown in FIG. 1 where the main brakes 90, 91 are caused to bear against the outer peripheries of the associated reel supporting disks 41 42, respectively, under pressure thereby applying braking action to these reel supporting disks 41, 42. As the result of the above described operations, the VTR apparatus is brought to the rest state.

When the high speed feeding button (not shown) is pushed down while the apparatus is in the above state, the arm 106 is pivoted in the clockwise direction about the supporting stud 72a and the first slide member 87 is moved in the direction D by means of the pin 107. The first bent position or projection 87a moves leftward so as to allow the arm 104 to be rotated in the counter-clockwise direction under the influence of the tension spring 105 about the stud 103, whereby the idler 102 is interposed between the winding reel supporting disc 42 and the rewinding roller 95 which is driven in the clockwise direction by the motor 63 energized from the first power supply source.

On the other hand, when the first slide member 87 is moved in the direction D and the second projection 87b thereby presses against the bent piece or projection 93a, the second brake member 93 is pivoted in the counter-clockwise direction about the shaft 89 and the first brake member 92 is also concurrently pivoted in the clockwise direction about the shaft 75a, thereby resulting in the disengagement of the main brake shoes 90 and 91 from the associated reel supporting disks 41 and 42, respectively. In this manner, the winding reel supporting disk 42 is rotated in the clockwise direction at a high speed by the motor 63 energized from the first power supply source 124 through the rewinding roller 95 and the idler 102, thereby to wind up the magnetic tape 6 at a high speed.

Figure 4:
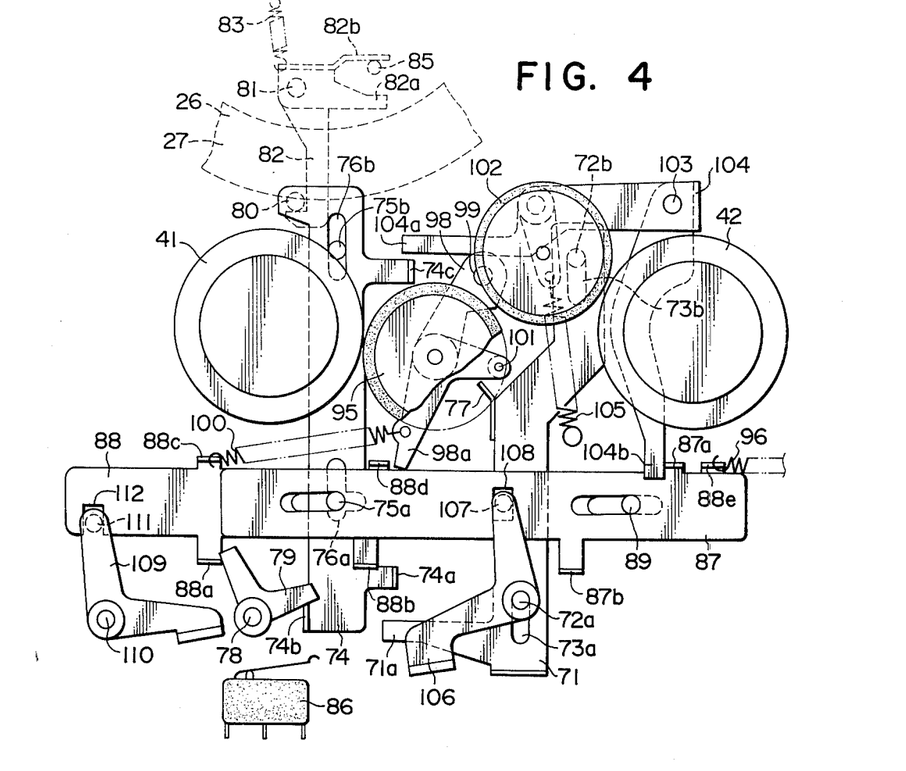
FIG. 4 is a fragmental plan view of FIG. 1 and shows the apparatus in the state immediately after a button for stoppage has been actuated.

Next, it is assumed that the rewinding button is pushed down in the rest state of the apparatus. In this case, the arm 109 is pivoted in the counterclockwise direction about the supporting shaft 110 thereby to move the second slide member 88 in the direction C. The fourth projection 88d moves in the direction C and the swingable lever 98 is pivoted in the clockwise direction about the fulcrum stud 99 under the force of the tension spring 100. The rewinding roller 95 driven by the motor 63 in the counterclockwise direction is caused to press against the outer periphery of the supply reel supporting disk 41 thereby rotating the supply reel 4 in the counterclockwise direction at a high speed, as is shown in FIG. 4. Since the first actuating member 71 is not operated in this case, the clockwise rotation of the swingable lever 98 is not prevented by the stopper 77.

Next, description will be made to the operation of the apparatus when it is changed-over from the reproducing or recording mode to the fast feeding or rewinding mode.

When the stop button and the fast feeding button are actuated while the apparatus is operated in the reproducing (play-back) or recording mode, the first actuating member 71 can be returned in the direction A, while the second actuating member 74 is inhibited from the restoring movement because of the pin 80 being latched by the lock lever 82. In other words, the second actuating member 88 remains in the displaced position as is shown in FIG. 4. Upon the returning movement of the first actuating member 71 in the direction A, the pin 101 is disengaged from the stopper 77. Thus, the rewinding roller 95 is caused to press against the periphery of the supply reel supporting disk 41, whereby the latter and hence the supply reel 4 are rotated in the clockwise direction. As the first and second tape lead-out means are returned from the operative position to the non-operative position the tape portion led out from the cassette 3 is wound on the supply reel 4 without being lossened. Since the switch (FIG. 9) is opened at that time, the motor 63 is supplied with energy from the second power source 125 and driven at a low speed. In this connection, it is noted that the arm 104 is prevented from rotation in the counterclockwise direction through the engagement between the one end portion 104a thereof and the projection 74c formed in the second actuating member 74 until the tape portion led out from the cassette 3 has been accommodated therein, even if the first slide member 87 is moved in the direction D. When the first and second tape lead-out and guiding means are returned to the non-operative position as driven by the motor, the pin 80 is released from the lock lever 82 and then the second actuating lever 74 can be restored in the direction A. In the meanwhile, the switch 132 shown in FIG. 9 is opened through the operation of the switch 86, thereby resulting in the stopping of motor 127 and the connecting of motor 63 to the first power source 124. Now, the end portion 104a of the arm 104 can release the projection 74c, whereby the lever 104 is rotated in the counterclockwise direction about the supporting stud 103 and the idler 102 is thus interposed between the rewinding roller 95 and the winding reel supporting disk 42. Thereafter, operations are performed in the same manner as the fast feeding operation.

Assuming that the stop button and the rewinding button are actuated in the recording or reproducing mode, the tape portion led out from the cassette 3 is restored therein, as the first and second tape lead-out means are moved to the starting positions in the manner described above. However, in this case, since the arm 109 is held in the counterclockwise rotated position by the actuation of the rewinding button (not shown), the second slide member 88 will remain in the position displaced to the left as viewed in FIG. 4, even when the second actuating lever 74 is returned in the direction A due to the disengagement of the pin 80 from the lock lever through the operation of the pin 84 after the magnetic tape 6 has been completely restored in the cassette. Accordingly, the main brake shoes 90 and 91 will remain in the disengaged positions from the respective reel supporting disks 41 and 42. The rewinding operation takes place when the rewinding roller 95 is pressed against the reel supporting disk 41. At this time, the second actuating lever 74 is returned in the direction A, whereby the connection of motor 63 is switched to the first power source 124 from the second source 125. The roller 95 is rotated at a suitable speed for the rewinding operation.

Although the invention has been described in conjunction with a preferred embodiment thereof, it should be appreciated that many modifications and variations on this embodiment will readily occur for those skilled in the art without departing from the spirit and scope of the invention defined by the appended claims.

I claim:

1. In a magnetic tape recording and reproducing apparatus comprising:
   (i) a head cylinder accommodating therein a plurality of magnetic heads;
   (ii) tape lead-out means for drawing out a magnetic tape from a tape cassette accommodating therein a supply reel and a winding reel, and for winding the magnetic tape drawn out around the peripheral wall of said head cylinder,
   said tape lead-out means having tape lead-out pins which move, when a recording or reproducing button is actuated, from a non-operative position where the tape lead-out pins are within the tape cassette to an operative position where the tape lead-out pins are in the vicinity of said head cylinder;
   (iii) a supply reel supporting disc on which the supply reel of the magnetic tape cassette rests;
   (iv) a winding reel supporting disc on which the winding reel of the magnetic tape cassette rests;
   (v) a tape feed means for feeding a magnetic tape from the supply reel to the winding reel by way of said head cylinder at a recording or reproducing speed when said magnetic tape recording and reproducing apparatus operates in a recording or reproducing mode;
   (vi) a first driving means for driving said supply reel supporting disc so as to rewind a magnetic tape onto the supply reel, said first driving means operating at a low speed when the tape lead-out pins return from the operative position to the non-operative position upon an actuation of a stop button or upon a detection of one end of a magnetic tape in a recording or reproducing mode, and operating at a high speed when said magnetic tape recording and reproducing apparatus operates in a rewinding mode upon actuation of a rewind button;
   (vii) a second driving means for driving said winding reel supporting disc so as to feed a magnetic tape from the supply reel to the winding reel at a higher speed than the recording or reproducing speed when a high speed feed button is actuated;
   (viii) a switch means for switching the speed of said first driving means from the low speed to the high speed when the rewind button is actuated;
   the improvement being a high speed feeding and rewinding mechanism comprising:
   (i) a first actuating member moving from its rest position to its active position when the recording or reproducing button is actuated and returning to the rest position when the stop button is actuated or when one end of a magnetic tape is detected in a recording or reproducing mode, said first actuating member when in the active position holding said first driving means so as to prevent said supply reel supporting disc from being driven;
   (ii) a second actuating member moving from its original position to a locking position in association with the movement of said first actuating member, said second actuating member when in its locking position holding said second driving means so as to prevent said winding reel supporting disc from being driven at said higher speed, said second actuating member when in its original position being adapted to be engaged with said switch means so as to switch said first driving means to the high speed operating state;
   (iii) a locking means for holding said second actuating member in said locking position when said tape lead-out pins move away from their non-operative position;

(iv) a high speed feed means which holds said second driving means so as to prevent said winding reel supporting disc from being driven, said high speed feed means being adapted to release said second driving means in response to actuation of said high speed feed button so that said second driving means promptly engages with said winding reel supporting disc whenever said second actuating member is released from the locking position;

(v) a first rewind means adapted to be actuated in response to the movement of said second actuating member from the original position to the locking position so as to engage said first driving means with said supply reel supporting disc whenever said first actuating member returns from the active position; and (vi) a second rewind means adapted to be operated in response to actuation of said rewind button so as to actuate said first rewind means.

2. An apparatus as set forth in claim 1, wherein said mechanism further comprises a first brake means for braking said supply reel supporting disc and a second brake means for braking said winding reel supporting disc, said first and second brake means being interlocked together so that said supply and winding reel supporting discs are simultaneously released when said high speed feed means is operated upon actuation of the high speed feed button or when said first rewind means is actuated in response to the movement of said second actuating member or in response to operation of said second rewind means.

3. An apparatus as set forth in claim 2, wherein said second rewind means consists of a third arm adapted to swing in response to actuation of the rewind button.

4. An apparatus as set forth in claim 1, wherein said high speed feed means comprises a first arm adapted to swing in response to actuation of the high speed feed button and a first sliding member adapted to move in the perpendicular direction to the moving direction of said first actuating member in association with the swinging operation of said first arm.

5. An apparatus as set forth in claim 1, wherein said first rewind means comprises a second arm adapted to swing in association with the movement of said second actuating member and a second slide member adapted to move in the perpendicular direction to the moving direction of said second actuating member in association with the swinging operation of said second arm.

6. An apparatus as set forth in claim 1, wherein said high speed feed means comprises a first arm adapted to swing in response to actuation of the high speed feed button and a second sliding member adapted to move in the perpendicular direction to the moving direction of said first actuating member in association with the swinging operation of said arm, and said first rewind means comprises a second arm adapted to swing in association with the movement of said second actuating member and a second slide member adapted to move in the perpendicular direction with the swinging operation of said second arm, said first and second slide members being superposed one upon another.

7. An apparatus as set forth in claim 1, wherein said locking means consists of a lock lever and a pin moved by said lead-out means, said lock lever being resiliently urged by a spring toward its locking position and said pin restraining said locking lever so as to prevent the latter from moving toward the locking position thereof when said tape lead-out pins are in said non-operative position.

* * * * *